March 25, 1952 W. W. PRICKETT 2,590,458
MEASURING AND DISPENSING APPARATUS FOR CONTAINERS
Filed July 11, 1947 2 SHEETS—SHEET 2

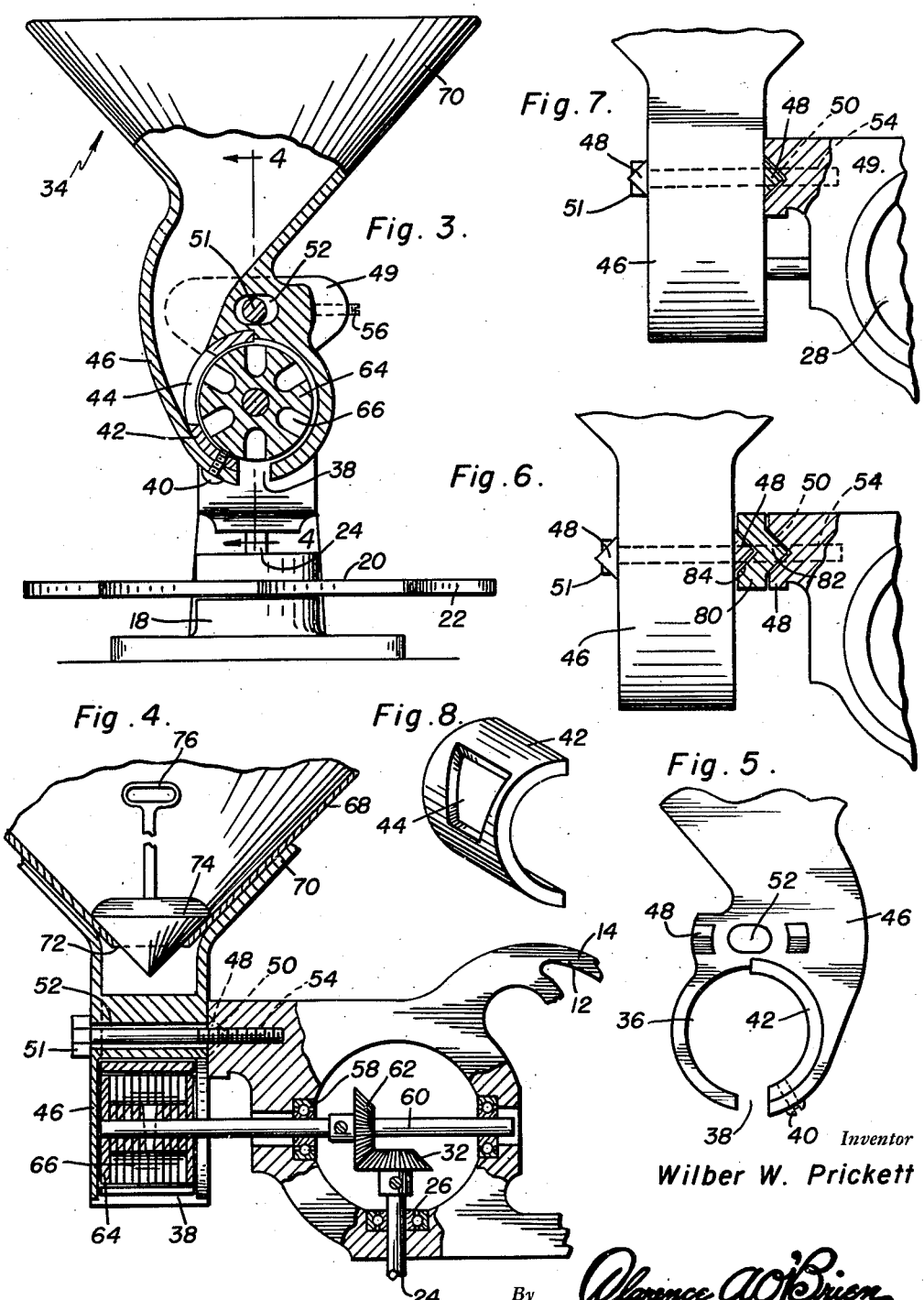

Inventor
Wilber W. Prickett

By Clarence A. O'Brien
and Harvey B. Jacobson
Attorneys

Patented Mar. 25, 1952

2,590,458

UNITED STATES PATENT OFFICE 2,590,458

MEASURING AND DISPENSING APPARATUS
FOR CONTAINERS

Wilber W. Prickett, San Diego, Calif., assignor of
one-half to Mona E. Prickett, San Diego, Calif.

Application July 11, 1947, Serial No. 760,185

4 Claims. (Cl. 222—368)

This invention relates to new and useful improvements in measuring and dispensing apparatus for containers and the primary object of the present invention is to provide a machine wherein a predetermined amount of the discharged articles is effected by the can on a conveyor belt system engaging and actuating a rotary plate journaled on the machine.

Another important object of the present invention is to provide a measuring and dispensing machine involving novel and improved means whereby an even amount of seasoning or the like may be regularly and automatically discharged into containers passing thereunder.

A further object of the present invention is to provide a machine with the foregoing purposes and including a rotor provided with measuring chambers so designed as to permit only one chamber to directly oppose the discharge opening in the hopper so that the discharge material will be retained only in a few of the chambers when the machine is not in operation.

A still further aim of the present invention is to provide a measuring and dispensing apparatus that is simple and practical in construction, efficient and reliable in operation, strong and durable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a transverse vertical sectional view taken substantially on the plane of section line 3—3 of Figure 2;

Figure 4 is a longitudinal vertical sectional view taken substantially on the plane of section line 4—4 of Figure 3;

Figure 5 is a fragmentary front elevational view of the lower portion of the hopper;

Figure 6 is a fragmentary side elevational view of the hopper and frame and showing the hopper adjusted in spaced relation to said frame;

Figure 7 is a fragmentary side elevational view of the hopper and frame and showing the manner in which the hopper is attached to the frame;

Figure 8 is a perspective view of the removable casing; and,

Figure 1:
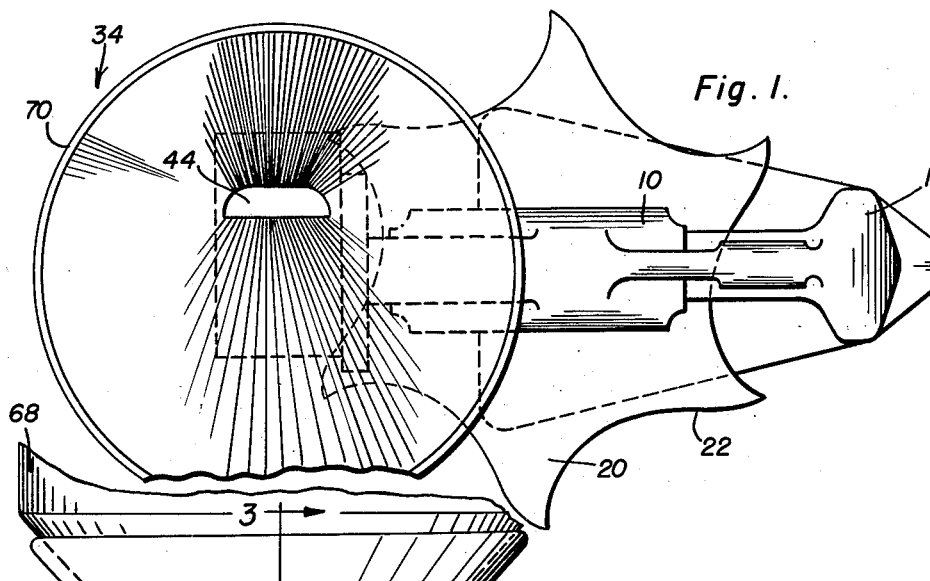
Figure 1 is a top plan view of the measuring and dispensing machine constructed in accordance with the present invention and with parts of the hopper broken away and shown in section.
Figure 2:
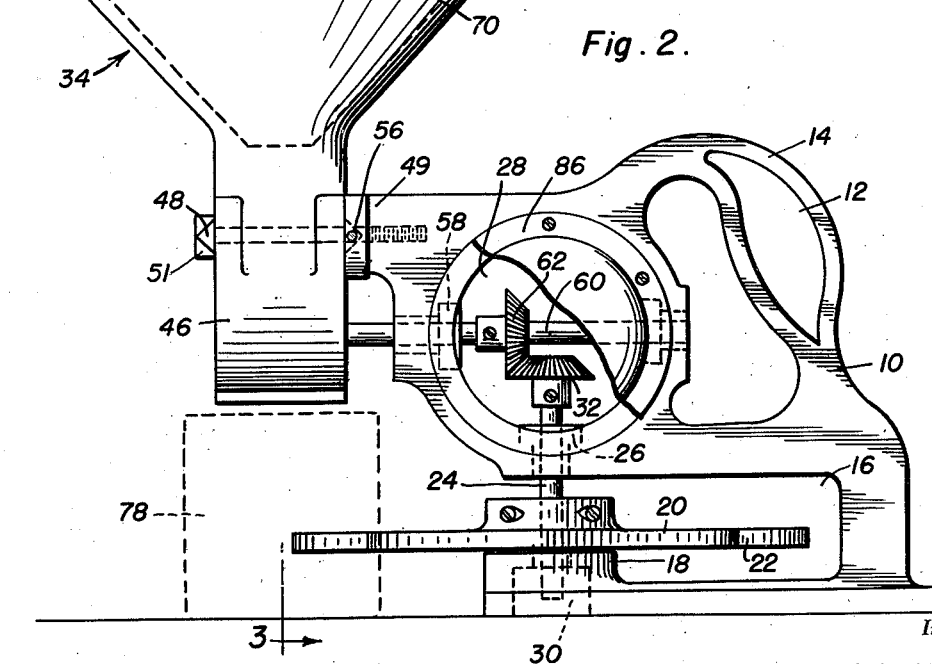
Figure 2 is a side elevational view of Figure 1 and with parts of the hopper insert therefor broken away and shown in section.
Figure 9:
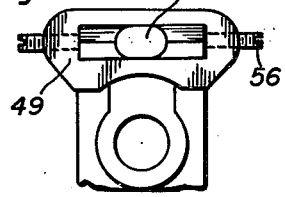
Figure 9 is a fragmentary front elevational view of a portion of the hopper supporting frame.

Referring now to the drawings in detail, wherein for the purpose of illustration, there is disclosed a preferred embodiment of the present invention, the numeral 10 represents a frame provided with suitable cut-out portions at its rear end to provide hand grips 14.

The lower portion of the frame is also cut-out, as at 16, and the lower face of this cut-out portion is provided with a bearing hub 18 supporting a rotatable plate 20 provided with a plurality of peripheral can engaging notches 22.

A vertically disposed shaft 24 removably secured to plate 20 has one terminal portion journalled in hub 18 and the other terminal portion of shaft 24 extends through a balled bearing 26 mounted in the lower periphery of a circular cut-out chamber 28 provided in the frame 10.

A removable balled bearing 30 carried by the lower end of the frame and the hub 18 receives the lower end of shaft 24.

A bevelled gear 32 is removably secured to the upper end of shaft 24 and is disposed within chamber 28.

The numeral 34 represents the hopper generally provided at its lower end with a circular bore or opening 36 having a longitudinal discharge port 38 therein.

Secured to the inner periphery of the bore by screws or the like 40 is a semi-circular casing 42 one end of which terminates adjacent one edge of the port 38. This plate is provided with an opening 44 registering with the opening in the neck 46 of the hopper.

Projecting outwardly from the forward rear faces of the hopper at its lower end, is a pair of longitudinally spaced V-shaped lugs 48 that are slidably received in V-shaped recesses 50 provided in the forward upper portion 49 of the frame. A bolt 51 extends through a longitudinal bore 52 at the lower end of the hopper and threadingly engages an internally threaded bore 54 in the frame. Set screws 56 carried by portion 49 bear against the lugs for holding the hopper in position to the frame.

Journalled in balled bearings 58 mounted in the sides of chamber 28 is a horizontal shaft 60 provided with a bevelled gear 62 that engages gear 32. One end of shaft 60 is fixedly secured to a cylindrical rotor 64 within the neck 46 of the hopper. The opening 44 in the plate 42 tapers inwardly toward the rotor 64.

A plurality of measuring chambers 66 are provided in the rotor to selectively oppose openings 44 as the rotor is actuated. It is preferred, that the rotor 64 be formed of a plurality of juxtapositioned plates having circumferentially spaced arcuate notches in their outer edges to form the chambers 66. In this manner, the relative size of the rotor may be increased or reduced for use of the same in various sizes of hoppers.

A funnel-shaped insert 68 of preferably glass material is placed into the funnel-shaped portion 70 of the hopper to increase the capacity of the material to be discharged. This insert is provided with an opening 72 at its lower end that communicates with the neck of the hopper. A stopper or pear-like plug 74 provided with a hand gripping stem 76 is selectively placed in the insert to close opening 72 when it is desired to prevent the material to be discharged from passing into the neck of the hopper.

In practical use of the device, the same may be conveniently placed at a selected point in contact with the travelling can 78 of a conveyor belt system (not shown) so that the can will forcefully engage the plate 20 and more particularly the notches 22 in the plate. As the can is pushed forwardly, the plate 20 rotates imparting a rotary motion to the rotor 64 so that the material placed in the funnel 70 will pass through the opening 44 into the chamber 66. Further rotation of the plate will cause the rotor to rotate thereby discharging the material in the chamber 66 into the can beneath port 38.

Reference is now directed to Figure 6, wherein there is shown a washer 80 having a V-shaped lug 82 that engages groove 50 in the frame and a V-shaped groove 84 that engages the lug 48, whereby the neck of the hopper may be spaced relative to the frame.

Retaining plates 86 are removably secured to the frame to cover chamber 28 so that a lubricant may be placed in chamber 28 for the gears 32 and 62.

Obviously, the hopper may be reversed relative to the frame whereby the frame may be applied to a conveyor belt system in an opposite direction than previously described.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a measuring and dispensing apparatus including a hopper having a circular bore including a discharge port and a driven shaft having a portion mounted in said bore; means controlling the discharge of material from the discharge port comprising, an arcuate plate secured to the inner periphery of the bore and having one end terminating adjacent the discharge port, said plate having an opening therein, and a rotor carried by said shaft having a plurality of chambers for selectively opposing the opening in said plate, the opening in said plate tapering inwardly toward said rotor.

2. The combination of claim 1, wherein said rotor includes a plurality of juxtapositioned plates each having a plurality of circumferentially spaced, radial notches in their peripheral edges, adjacent faces of adjacent plates being in contact with each other.

3. In a dispensing apparatus including a hopper and a supporting frame therefor; means detachably securing the hopper to the frame, said means comprising a pair of spaced, substantially V-shaped lugs carried by the hopper, V-shaped recesses provided in the frame slidably receiving said lugs, a laterally slidable anchoring bolt carried by the hopper and securing the hopper to the frame, and set screws carried by the frame bearing against the lugs.

4. A dispensing apparatus comprising a frame, a hopper having an arcuate delivery chute including a substantially vertical delivery opening, means adjustable and detachably securing said hopper to said frame, a rotor mounted in said chute and having a plurality of measuring chambers, and means mounted in said chute about the rotor for regulating the flow of material from said chute into said chambers, said last mentioned means including an arcuate plate fixed in said chute and having an opening tapering toward said rotor and forming a passage between said chute and said rotor.

WILBER W. PRICKETT.

REFERENCES CITED

The following references are of record in the file of this patent:

UNITED STATES PATENTS

| Number | Name | Date |
| --- | --- | --- |
| 1,069,527 | Carman | Aug. 5, 1913 |
| 1,372,869 | Draver | Mar. 29, 1921 |
| 1,398,351 | Williams | Nov. 29, 1921 |
| 1,437,863 | Raymond | Dec. 5, 1922 |
| 1,833,028 | Lindley | Nov. 24, 1931 |

FOREIGN PATENTS

| Number | Country | Date |
| --- | --- | --- |
| 574,796 | Great Britain | Feb. 21, 1945 |